United States Patent
Agrawal et al.

(10) Patent No.: US 12,475,443 B2
(45) Date of Patent: Nov. 18, 2025

(54) PAYMENT RECOVERY BOOT MODE FOR MOBILE DEVICES

(71) Applicant: Motorola Mobility LLC, Chicago, IL (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/535,037

(22) Filed: Dec. 11, 2023

(65) Prior Publication Data

US 2025/0190960 A1 Jun. 12, 2025

(51) Int. Cl.
*G06Q 20/32* (2012.01)
*G06F 9/4401* (2018.01)
*G06Q 20/10* (2012.01)

(52) U.S. Cl.
CPC ......... *G06Q 20/102* (2013.01); *G06F 9/4406* (2013.01); *G06Q 20/322* (2013.01)

(58) Field of Classification Search
None
See application file for complete search history.

(56) References Cited

U.S. PATENT DOCUMENTS

2021/0122165 A1 * 4/2021 Watanabe ............. G06F 3/1287

FOREIGN PATENT DOCUMENTS

KR 20210119357 A * 10/2021 ......... H04N 21/2381

OTHER PUBLICATIONS

Google LLC , "Device Lock Controller", Google Play [retrieved Sep. 1, 2023]. Retrieved from the Internet <https://play.google.com/store/apps/details?id=com.google.android.apps.devicelock&hl=en_IN&gl=US>, 4 pages.
Rahman, Mishaal , "Google made an app for creditors to lock you out of your financed phone if you don't make payments [Updated]", XDA News Brief [retrieved Sep. 1, 2023]. Retrieved from the Internet <https://www.xda-developers.com/google-device-lock-controller-banks-payments/>, Nov. 6, 2020, 5 pages.

* cited by examiner

*Primary Examiner* — Joseph W. King
(74) *Attorney, Agent, or Firm* — FIG. 1 Patents (57) ABSTRACT

In aspects of payment recovery boot mode for mobile devices, a mobile device transmits a payment status request to a network device. The network device receives an identifier of the mobile device and, based on the identifier, determines a payment status of the mobile device indicates a payment for the mobile device is pending. The mobile device receives, from the network device, a payment status response indicating a payment for the mobile device is pending. The mobile device initiates a payment recovery boot mode of the mobile device based on the payment status response.

20 Claims, 7 Drawing Sheets

PAYMENT RECOVERY BOOT MODE FOR MOBILE DEVICES

BACKGROUND

Smartphone manufacturers can offer financing options to customers, enabling customers to purchase devices through installment plans. This way, a customer may receive and use the device before the device has been paid for in full. This enables a potential customer to use a device much sooner than would be possible if the user had to wait until the entire device is paid for up front. Nevertheless, improvements to the purchase of devices through installment plans could be made that would make the process more seamless and prevent non-paying customers from circumventing the process.

BRIEF DESCRIPTION OF THE DRAWINGS

Implementations of the techniques for payment recovery boot mode of mobile devices are described with reference to the following Figures. The same numbers may be used throughout to reference like features and components shown in the Figures.

DETAILED DESCRIPTION

Implementations of the techniques for payment recovery boot mode of mobile devices may be implemented as described herein. A mobile device such as any type of a wireless device, mobile phone, flip phone, client device, game controller, wearable computing device, camera device, tablet computing device, communication device, entertainment device, gaming device, media playback device, and/or any other type of computing, consumer, and/or electronic device, or a system of any combination of such devices, may be configured to perform techniques for payment recovery boot mode of mobile devices as described herein. In some cases, at least one mobile device implements an instantiation of a payment controller, enabling the payment recovery boot mode functionality described herein.

Smartphone manufacturers can offer financing options to customers, enabling customers to purchase devices through installment plans. The manufacturer or a partner financial institution may provide credit for the purchase. If a user fails to make installment payments on time, the manufacturer may implement device locking mechanisms as a measure to ensure payment. For example, the device could be locked (e.g., entirely locked), restricting access to features until payments are cleared. Such measures act as an incentive for customers to meet payment deadlines and mitigate financial risks for manufacturers, encouraging responsible payment behavior.

Conventional approaches include locking all access to the device, notifying the users to pay using a different device (e.g., via email, via regular mail, etc.), and then sending a unique "unlock code" once payment is received. For some users, this approach does not work as some users are unlikely to have another device. Such users are not able to use the device and as a result the business is unable to recover payment. Some conventional approaches allow the device to boot, but enable just the payment application on the device for the user to make the payment. However, because an "application software" is typically involved in making the payment, the entire software stack is booted. Thus, with some system tweaks, the user could use most of the device's functionality without paying. Other conventional approaches include giving the user a temporary code to unlock the device temporarily (e.g., for an hour, for a day, etc.), but this involves overhead for the business and the user, and additionally opens up the system for misuse. Such relaxed device security could give false hopes to users who fall prey to paying for unreliable solutions that promise to unlock the device for a fee (e.g., unauthorized unlocking tools), which can result in compromising the device software's security and integrity (e.g., malware).

In one example, a user buys a smartphone on an installment plan. The smartphone is the user's only device for communication, work, and entertainment, making the smartphone an indispensable part of his daily life. The user's excitement turns into worry when his newly acquired smartphone gets locked due to missing a payment deadline. With no other device available, the user reaches out to a friend to borrow his device, but unfortunately, the friend is out of town. The user now has the necessary money, but is unable to pay due to lack of any device to execute the transfer. Meanwhile, the user continues exploring other options.

In another example, a user is locked out of his smartphone, but notices that the entire software has booted, while full access is restricted. The user then finds an unauthorized solution to unlock his phone, successfully gaining access and using it without any limitation. However, sometime later, the user notices something is amiss. Some of the smartphone's software is acting strangely, and upon investigation, the user realizes that the solution to unlock the phone has introduced a virus that compromised the smartphone's security, application data, and/or user data. Such users realize that there is a need for a device locking mechanism that prevents risky bypassing while still providing a secure way for users to make pending payments using the same device.

The techniques described herein provide a payment recovery boot mode for devices where limited services are provided while the device is still booting (e.g., before the device is fully booted with full access). The payment recovery boot mode provides services that enable a user to make a payment. Based on the described techniques, non-essential services are intentionally not allowed to be loaded in the payment recovery boot mode.

The booting of an operating system includes multiple stages. The payment recovery boot mode may occur at any of the following stages of the boot process. The boot process may include a power-on self-test (POST). When a device is powered on, the hardware undergoes a power-on self-test to check if all essential hardware components are functional. This step ensures that the basic hardware is operational before the operating system starts loading. After the POST, the system's basic input output system (BIOS) firmware or unified extensible firmware extension (UEFI) firmware locates and loads the bootloader from the boot device (e.g., main device storage). The bootloader is responsible for initiating the loading process of the operating system. The bootloader transfers control to the operating system kernel, which is the core component of the operating system. The kernel initializes the system's essential functions and drivers. After the kernel is loaded, various initialization processes and essential services are loaded. This includes setting up the filesystem, initializing networking, and loading device drivers.

After the initialization processes and essential services are loaded, the boot process reaches a point where user interface elements are increasingly involved. Depending on the operating system and its configuration, the system may load the graphical user interface (GUI) or a command-line interface (CLI) at this stage. Once the operating system and essential services are up and running, any applications or services configured to start automatically are launched at this point. Such applications can vary depending on the user's preferences, installed software, system settings, etc. Finally, the system prompts the user to log in with their credentials. After successful login, any user-specific applications configured to start with the user's session are launched.

The techniques of payment recovery boot mode described herein load those services (e.g., only those services) that enable a user to make a payment that is due. In one or more examples, the payment recovery boot mode functionality is performed via at least one mobile device that implements an instantiation of a payment controller. In some cases, the payment controller checks for pending payment while a device is booting (e.g., based on a user restarting the device). As part of the boot sequence, the payment controller may check a payment status with a network resource (e.g., a network device). For example, after network services are loaded during the boot process of a device, the payment controller may check with a network device to determine whether payment is due for the device (e.g., past due).

In some examples, the payment status is based on the payment controller providing an identifier of the device to the network device while the device is in payment recovery boot mode, and the network device using the identifier as a key value in a payment database that indicates payment information. The payment information may include payment amount, payment deadline, payment schedule, amount still owed, amount paid off, etc., mapped to an identifier of an associated device. Additionally, or alternatively, the payment controller of a device may check payment status while the device is booted and fully functional. In some cases, the payment controller may reboot the device to load the payment recovery boot mode based on a result of checking the payment status. Additionally, or alternatively, the network device may check payment status while the device is booted and fully functional. As a result, the network device may instruct the payment controller to reboot the device to load the payment recovery boot mode.

When the network device indicates a pending payment (e.g., indicates payment is past due), the payment controller puts the device in the payment recovery boot mode. When a device is booting, the payment recovery boot mode ensures the regular boot process is aborted. In some cases, this includes preventing the loading of the GUI and/or general-purpose applications. In some cases, the payment recovery boot mode brings up a payment interface that enables a user to enter payment details (e.g., banking credentials, account information, credit card information, etc.). In some cases, the payment recovery boot mode displays any one-time passcode associated with making a payment (e.g., authentication of payment details). When the network device determines that the payment goes through successfully, the network device instructs the payment controller of the device that payment is successful. In some cases, the payment controller displays the payment confirmation message in the payment recovery boot mode and the payment controller proceeds to reboot the device in full function boot mode (e.g., regular boot mode).

The techniques of payment recovery boot mode described herein provide multiple advantages and benefits. For example, a payment controller of a device implements payment recovery boot mode functionality to enable a user to make payments for the device on the same device. Thus, based on the payment recovery boot mode, a user is not forced to use another device to make a payment. Instead, the payment recovery boot mode enables a user of a device on which payment is due to use the same device to make a payment. Also, the payment recovery boot mode provides a secure payment interface that enables the user to make a payment without putting the integrity of the device at risk based on unauthorized unlocking tools that could introduce the device to malware, etc. For example, the payment recovery boot mode functionality provides a payment interface to process payment details without providing full access to the device. Accordingly, the integrity of the device is protected from potential harm. In some cases, the payment recovery boot mode functionality provides access to emergency calling, enabling a user to make emergency calls without providing full access to the device.

While features and concepts of the described techniques for payment recovery boot mode of mobile devices are implemented in any number of different mobile devices, systems, environments, and/or configurations, implementations of the techniques for payment recovery boot mode of mobile devices are described in the context of the following example devices, systems, and methods.

Figure 1:
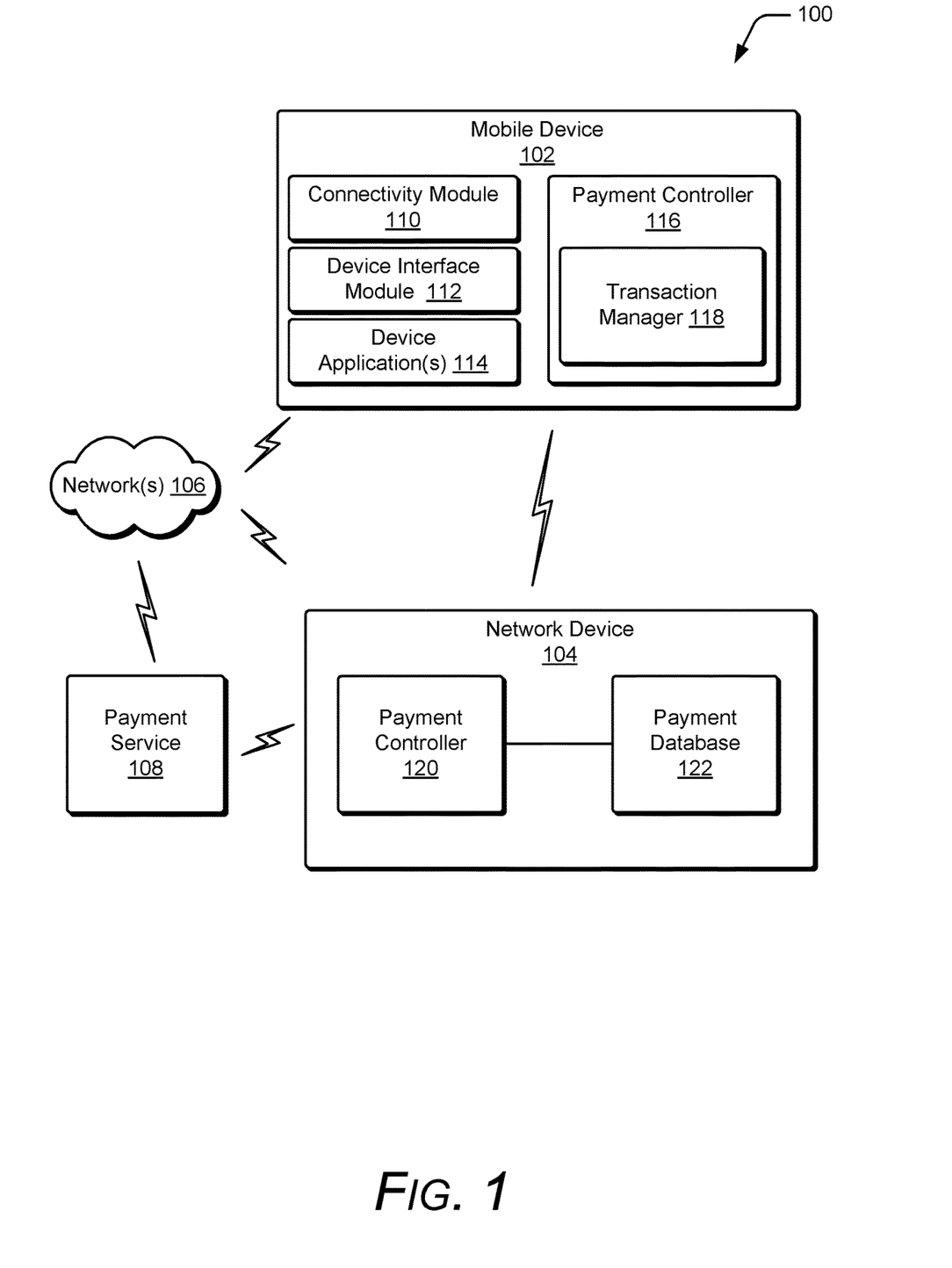
FIG. 1 illustrates an example system for payment recovery boot mode of mobile devices in accordance with one or more implementations as described herein.

FIG. 1 illustrates an example system 100 for payment recovery boot mode of mobile device, as described herein. The system 100 includes one or more mobile devices such as a mobile device 102, one or more network devices such as network device 104, a communication network 106, and/or a payment service 108. Examples of mobile devices include at least one of any type of a wireless device, mobile device, mobile phone, flip phone, client device, game controller, wearable computing device, camera device, display device, tablet computing device, communication device, entertainment device, gaming device, media playback device, any other type of computing and/or electronic device, and/or a system of any combination of such devices.

The mobile device 102 is implemented with various components, such as a processor system and memory, as well as any number and combination of different components as further described with reference to the example device shown in FIG. 7. In implementations, the mobile device 102 includes various radios for wireless communication with other devices. In one or more examples, the mobile device 102 includes at least one of a BLUETOOTH® (BT) or BLUETOOTH® Low Energy (BLE) transceiver, a near field communication (NFC) transceiver, or the like. In some cases, the mobile device 102 includes at least one of a WI-FI® radio, a cellular radio, a global positioning satellite (GPS) radio, or any available type of device communication interface.

The system 100 includes the network device 104, such as any type of server, cloud computing network, gateway, storage device, database, data center, storage enclosure, laptop device, desktop device, smart device, mobile device, or any other type of computer network device. Similar to the mobile device 102, the network device 104 is implemented with various components, such as a processor system and memory, as well as any number and combination of the different components as further described with reference to the example device shown in FIG. 7. In implementations, the mobile device 102 is communicatively linked, either by a wired or wireless connection, to the network device 104. For example, the mobile device 102 and the network device 104 are communicatively linked via the communication network 106 and/or via direct inter-device connectivity, e.g., via direct wireless and/or wired connectivity between the mobile device 102 and the network device 104.

In some implementations, the devices, applications, modules, servers, and/or services described herein communicate via the communication network 106, such as for data communication between the mobile device 102 and the network device 104. The communication network 106 includes a wired and/or a wireless network. The communication network 106 is implemented using any type of network topology and/or communication protocol, and is represented or otherwise implemented as a combination of two or more networks, to include IP-based networks, cellular networks, and/or the Internet. The communication network 106 includes mobile operator networks that are managed by a mobile network operator and/or other network operators, such as a communication service provider, mobile phone provider, and/or Internet service provider.

The mobile device 102 includes various functionalities that enable the device to implement different aspects of payment recovery boot mode for mobile devices, as described herein. In the illustrated example, the mobile device 102 includes a connectivity module 110, a device interface module 112, device applications 114, and a payment controller 116. The connectivity module 110 represents functionality (e.g., logic, software, and/or hardware) enabling the mobile device 102 to interconnect with other devices and/or networks, such as the network device 104 and the communication network 106. For example, the connectivity module 110 enables wireless and/or wired connectivity of the mobile device 102. The device interface module 112 represents functionality enabling the mobile device 102 to interface with other devices. As further detailed below, the device interface module 112 enables the mobile device 102 to establish wireless and/or wired data communication with other devices, such as the network device 104. device interface module 112 device interface module 112

Similarly, the network device 104 includes various functionality that enables the computing device to implement different aspects of payment recovery boot mode for mobile devices, as described herein. In some examples, the network device 104 may include a device connectivity module enabling wireless and/or wired connectivity of the network device 104 with one or more other devices (e.g., the mobile device 102, networks 106, payment service 108). Additionally, or alternatively, the network device 104 may include a device interface module enabling the network device 104 to interface with other devices (e.g., the mobile device 102, networks 106, payment service 108).

The mobile device 102 and/or the network device 104 can include and implement device applications 114, such as any type of messaging application, email application, video communication application, cellular communication application, music/audio application, gaming application, media application, social platform application, and/or any other of the many possible types of device applications. Many of the device applications 114 have an associated application user interface that is generated and displayed for user interaction and viewing, such as on a display screen of the mobile device 102 and/or on a display of the network device 104. Generally, an application user interface, or any other type of video, image, graphic, and the like is digital image content that is displayable on the display screen of the mobile device 102 and/or on the display of the network device 104.

In the example system 100 for payment recovery boot mode of mobile device, the mobile device 102 and the network device 104 are devices that incorporate payment recovery boot mode functionality. At least one of the mobile device 102 or the network device 104 implements an instantiation of a payment controller (e.g., as a device application 114). The payment controller 116 and/or the payment controller 120 represent functionality (e.g., logic, software, and/or hardware) enabling implementation of described techniques for payment recovery boot mode of a mobile device (e.g., the mobile device 102). The payment controller 116 and/or the payment controller 120 can be implemented as computer instructions stored on computer-readable storage media and can be executed by a processor system of the mobile device 102 and/or of the network device 104, respectively. Alternatively or in addition, the payment controller 116 and/or the payment controller 120 can be implemented at least partially in hardware of a device.

In one or more implementations, the payment controller 116 and/or the payment controller 120 includes independent processing, memory, and/or logic components functioning as a computing and/or electronic device integrated with the mobile device 102 and/or with the network device 104, respectively. Alternatively or in addition, the payment controller 116 and/or the payment controller 120 can be implemented in software, in hardware, or as a combination of software and hardware components. In one or more examples, the payment controller 116 and/or the payment controller 120 is implemented as a software application or module, such as executable software instructions (e.g., computer-executable instructions) that are executable with a processor system of the mobile device 102 and/or the network device 104, respectively, to implement the techniques and features described herein. As a software application or module, the payment controller 116 and/or the payment controller 120 is stored on computer-readable storage memory (e.g., memory of a device), or in any other suitable memory device or electronic data storage implemented with the module. Alternatively or in addition, the payment controller 116 and/or the payment controller 120 is implemented in firmware and/or at least partially in computer hardware. For example, at least part of the payment controller 116 and/or the payment controller 120 is executable by a computer processor, and/or at least part of the payment controller 116 and/or the payment controller 120 is implemented in logic circuitry.

In the illustrated example, the payment controller 116 includes a transaction manager 118. In one or more examples, the payment controller 116 transmits a payment status request to the network device 104. In implementations, the payment controller 116 receives, from the network device 104, a payment status response indicating a payment for the mobile device 102 is pending. The payment controller 116 may then initiate a payment recovery boot mode of the mobile device 102 based on the payment status response. In some cases, the payment recovery boot mode locks full access to the mobile device 102 until a requested payment is confirmed.

In some cases, the payment status request is transmitted during a reboot of the mobile device 102. In variations, the reboot of the mobile device 102 is based on a user input restarting the mobile device 102. In some examples, the reboot of the mobile device 102 is based on the mobile device 102 receiving a reboot command from the network device 104.

In one or more examples, the transaction manager 118 generates and/or displays a payment interface in the payment recovery boot mode. In some cases, the transaction manager 118 receives, in the payment interface, user input that includes payment details. The payment details may include an account number, an account user name, an account password, a credit card number, a payment amount, a payment date, etc. In some cases, the transaction manager 118 transmits the payment details to the network device 104.

In one or more implementations, while the mobile device 102 is in the payment recovery boot mode, the transaction manager 118 displays a one-time passcode received from the network device 104. In some cases, the transaction manager 118 transmits, to the network device 104 while in the payment recovery boot mode, a user input entered in response to the one-time passcode. In some examples, the one-time passcode is received based on transmission of the payment details to the network device 104.

In one or more examples, the transaction manager 118 receives, from the network device 104 while the mobile device 102 is in the payment recovery boot mode, a confirmation that the payment for the mobile device 102 is up to date. Accordingly, the payment controller may restart the mobile device 102 from the payment recovery boot mode and initiate a full access boot mode based on the confirmation that the payment is up to date.

In the illustrated example, the payment controller 120 receives, from a mobile device 102, an identifier of the mobile device 102. In some cases, the payment controller 120 determines that a payment status of the mobile device 102 indicates a payment for the mobile device 102 is pending. In implementations, the payment controller 120 can determine the payment status while the mobile device 102 is booting or after the mobile device 102 has booted, after an operating system of the mobile device 102 has booted, after the mobile device 102 enters regular operation, etc.

In one or more examples, the payment controller 120 initiates a payment recovery boot mode of the mobile device 102 based on the payment status indicating the payment for the mobile device 102 is pending. To initiate the payment recovery boot mode, the payment controller 120 may transmit a reboot command to the mobile device 102. To determine the payment status of the mobile device 102 indicates the payment for the mobile device 102 is past due, the payment controller 120 queries the payment database 122 using the identifier of the mobile device 102.

The payment controller 120 may query the payment database 122 while the mobile device 102 is booted with full access and/or while the mobile device 102 is booting. In one or more examples, the payment controller 120 may receive an identifier of the mobile detect during a reboot of the mobile device 102, when the mobile device 102 first requests access to the network device 104, etc. At any time after the network device 104 receives the identifier of the mobile device 102 (e.g., while the mobile device 102 is rebooting and/or after the mobile device 102 is booted, etc.), the payment controller 120 may check the payment status of the mobile device 102.

In one or more examples, the payment controller 120 transmits the reboot command to the mobile device 102 based on the query indicating the payment for the mobile device 102 is past due. To initiate the payment recovery boot mode, the payment controller may query a payment database based on a payment status request received from the mobile device 102 while the mobile device 102 is rebooting. In some cases, the payment controller 120 transmits, to the mobile device 102 while the mobile device 102 is rebooting, a payment status response indicating the payment for the mobile device 102 is past due.

In implementations, the payment controller 120 receives payment details from the mobile device 102 and transmits the payment details to the payment service 108. The payment service 108, for instance, represents a service that provides credit lending, financial transactions, banking transactions, payment transactions, online banking, payment processing, and/or credit card payment processing. In some cases, the payment controller 120 receives a request for a one-time passcode from the payment service 108 based on transmission of the payment details to the payment service 108. The payment controller 120 may receive the one-time passcode from the payment service 108 and transmit the one-time passcode to the mobile device 102. When the payment controller 120 receives a user input entered in response to the request for one-time passcode (e.g., the one-time passcode entered by the user or entered autonomously by the payment controller 116), the payment controller 120 transmits the user input to the payment service 108.

In one or more examples, the payment controller 120 receives a payment confirmation from the payment service 108 based on the transmission of the user input. In some cases, the payment controller 120 updates the payment database 122 based on the payment confirmation. Additionally, or alternatively, the payment controller 120 transmits, to the mobile device 102, a confirmation that the payment for the mobile device 102 is up to date. Accordingly, the payment controller 116 and/or the payment controller 120 enable a user to make payments for the mobile device 102 via the mobile device 102, without putting the security and integrity of the mobile device 102 at risk.

Figure 2:
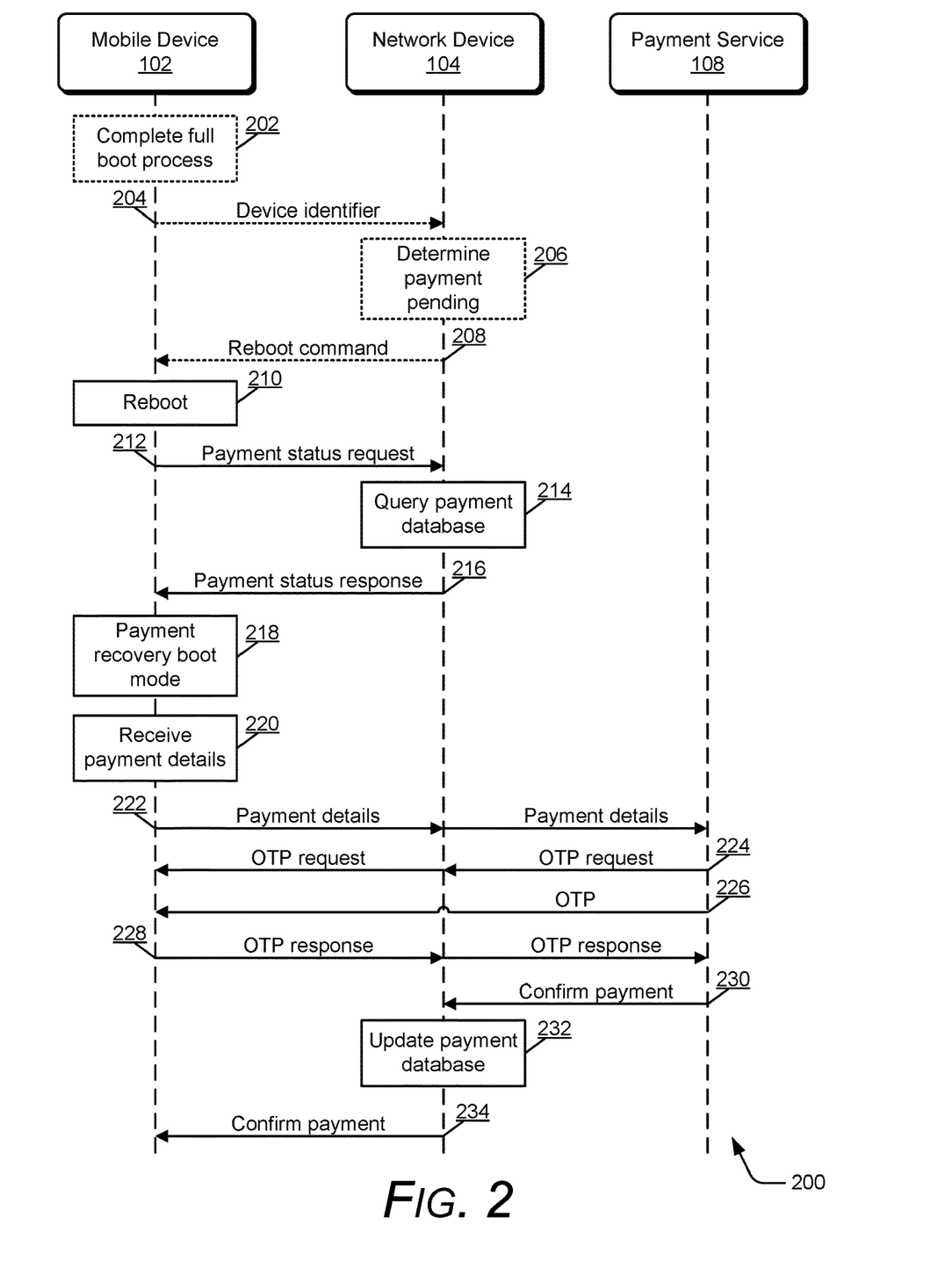
FIG. 2 further illustrates a process flow diagram for payment recovery boot mode of mobile devices in accordance with one or more implementations as described herein.

FIG. 2 illustrates a process flow diagram 200 for payment recovery boot mode of mobile devices in accordance with one or more implementations as described herein. As shown, the process flow diagram 200 includes the mobile device 102, the network device 104, and the payment service 108. In one or more examples, the payment controller 116 of the mobile device 102 and/or the payment controller 120 of the network device 104 enables payment recovery boot mode functionality associated with the process flow diagram 200.

At 202, the mobile device 102 optionally completes a full boot process. For example, the mobile device 102 is booted with full end-user functionality or a default functionality.

At 204, the mobile device 102 optionally transmits an identifier of the mobile device 102 to the network device 104. For example, the mobile device 102 may transmit an identifier of the mobile device 102 to the network device 104 after the mobile device 102 has booted.

At 206, the network device 104 optionally determines (e.g., while the mobile device 102 is fully booted) that payment for the mobile device 102 is pending (e.g., payment is past due). For example, the network device 104 determines that payment is pending based on a query of the payment database 122 using the identifier of the mobile device 102.

At 208, the network device 104 optionally transmits a reboot command to the mobile device 102. For example, based on the determination that payment is pending, the network device 104 may transmit a reboot command to the mobile device 102.

At 210, the mobile device 102 reboots. For example, based on the reboot command from the network device 104, the mobile device 102 may reboot. In some examples, the mobile device 102 may autonomously reboot (e.g., without user input) based on the reboot command. Additionally, or alternatively, the mobile device 102 may reboot based on a user rebooting the mobile device 102.

At 212, the mobile device 102 transmits a payment status request to the network device 104. For example, while the mobile device 102 is rebooting, the mobile device 102 may transmit the payment status request to the network device 104. In some cases, the payment status request may include an identifier of the mobile device 102.

At 214, the network device 104 queries the payment database 122. For example, the network device 104 may query the payment database 122 (e.g., while the mobile device 102 is rebooting) based on the network device 104 receiving the payment status request.

At 216, the network device 104 transmits a payment status response to the mobile device 102. In some cases, the payment status response indicates that payment for the mobile device 102 is pending (e.g., is past due). In some cases, the network device 104 transmits the payment status request while the mobile device 102 is rebooting.

At 218, the mobile device 102 enters payment recovery boot mode (e.g., while rebooting). For example, based on the mobile device 102 receiving the payment status response indicating payment is pending (e.g., past due), the mobile device enters payment recovery boot mode.

At 220, the mobile device 102 receives payment details. In some cases, the payment recovery boot mode may include a payment interface that enables a user to enter payment details. Accordingly, the mobile device 102 may receive payment details via a payment interface of the payment recovery boot mode.

At 222, the mobile device 102 transmits the payment details to the network device 104. For example, the mobile device 102 submits a payment to the network device 104 and the network device 104 relays the submitted payment to the payment service 108. In some examples, the payment details may include at least one of an account number, an account username, an account password, a credit card number, an amount being paid, a payment date, etc. In the illustrated example, the network device 104 receives the payment details from the mobile device 102 and relays the payment details to the payment service 108.

At 224, the payment service 108 transmits a one-time passcode request to the network device 104. In the illustrated example, the network device 104 relays the one-time passcode request to the mobile device 102. In some cases, the payment service 108 confirms the payment details and then generates and transmits the one-time passcode request.

At 226, the payment service 108 transmits a one-time passcode to the mobile device 102. In the illustrated example, the payment service 108 transmits the one-time passcode directly to the mobile device 102 to confirm that the payment request is authentic.

At 228, the mobile device 102 transmits a one-time passcode response to the network device 104 and the network device 104 relays the one-time passcode response to the payment service 108. For example, the mobile device 102 receives the one-time passcode from the payment service 108. As a result, the mobile device 102 receives a one-time passcode response (e.g., user input entered by a user on the payment interface of the payment recovery boot mode based on the received one-time passcode). The user input is then communicated to the payment service 108. Alternatively, the payment service 108 sends the one-time passcode directly to the mobile device 102 and the mobile device 102 transmits the one-time passcode response directly to the payment service 108.

At 230, the payment service 108 transmits a payment confirmation to the network device 104 (e.g., based on confirmation of the one-time passcode response).

At 232, the network device 104 updates the payment database 122 based on the payment confirmation. For example, the network device 104 updates the payment information for the mobile device 102 based on the payment confirmation from the payment service 108.

At 234, the network device 104 transmits the payment confirmation to the mobile device 102. In some cases, the network device 104 transmits a restart command to the mobile device 102 (e.g., with the payment confirmation, or separate from the payment confirmation). When the mobile device 102 restarts, the network device 104 permits the mobile device 102 to complete the full boot process, enabling full functionality (e.g., a default functionality) of the mobile device 102.

Figure 3:
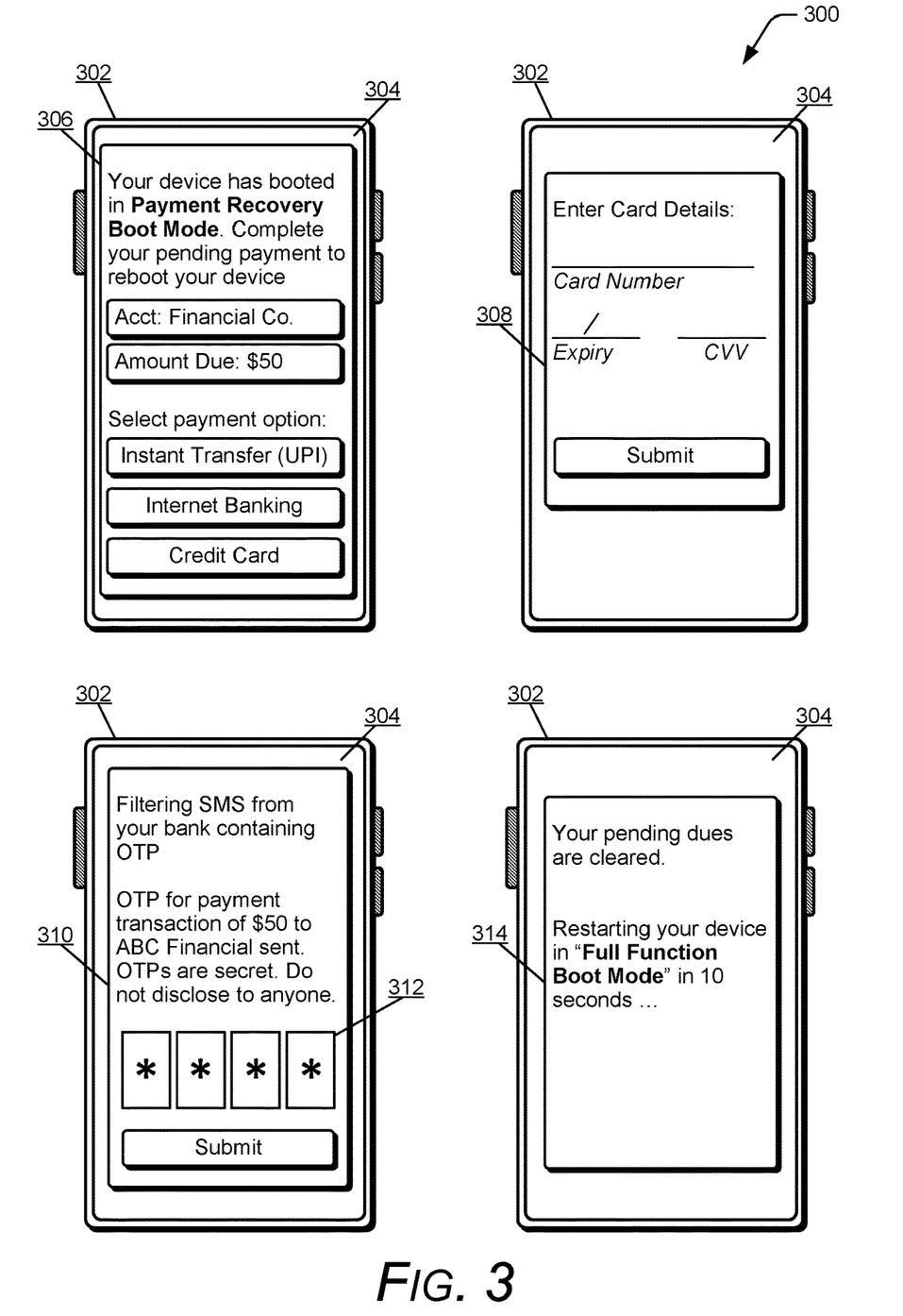
FIG. 3 further illustrates an example of payment recovery boot mode of mobile devices in accordance with one or more implementations of the techniques described herein.

FIG. 3 illustrates example 300 of payment recovery boot mode of mobile devices in accordance with one or more implementations of the techniques described herein. As shown, the example 300 includes a mobile device 302. The mobile device 302 may be an example of the mobile device 102 of FIG. 1 and/or FIG. 2.

In the illustrated example, the mobile device 302 includes a screen 304. In one or more examples, the screen 304 is a touchscreen configured to display content and receive input (e.g., touch input via a user interface such as a user interface of the mobile device 102).

In one or more examples, the screen 304 displays information regarding the mobile device 302 being in a payment recovery boot mode. As shown, the information includes account information that provided credit for the purchase of mobile device 302 (e.g., Financial Co.) as well as the amount due (e.g., $50 due). As shown, the information may also include payments options. For example, the payment recovery boot mode may provide an instant transfer payment option, an internet banking payment option, and/or a credit card payment option.

Based on a user select of the payment option, the screen 304 displays a payment interface 308. In the illustrated example, a user may select the credit card payment option. Accordingly, the payment interface 308 includes a field to enter a credit card number, a field to enter the expiration date, and a field to enter the card verification value (CVV) for the credit card. As shown, the payment interface 308 includes a graphical submit button to enable the user to submit the entered payment details.

In the illustrated example, the screen 304 displays a one-time passcode interface 310 for the submitted payment details. As shown, the one-time passcode interface 310 includes a field 312 to enter the one-time passcode (e.g., to enter a 4-digit one-time passcode as shown).

In one or more examples, the screen 304 displays a payment confirmation 314. As shown, the payment confirmation 314 provides a message indicating the submitted payment was successful and that the pending dues are now cleared. As shown, the payment confirmation 314 indicates that the mobile device 302 is restarting in full function boot mode (e.g., a default boot mode providing full functionality of the mobile device 302).

Example methods 400, 500, and 600 are described with reference to respective FIGS. 4, 5, and 6 in accordance with one or more implementations of payment recovery boot mode for mobile devices, as described herein. Generally, any services, components, modules, managers, controllers, methods, and/or operations described herein can be implemented using software, firmware, hardware (e.g., fixed logic circuitry), manual processing, or any combination thereof. Some operations of the example methods are described in the general context of executable instructions stored on computer-readable storage memory that is local and/or remote to a computer processing system, and one or more implementations include software applications, programs, functions, and the like. Alternatively or in addition, any of the functionality described herein is performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
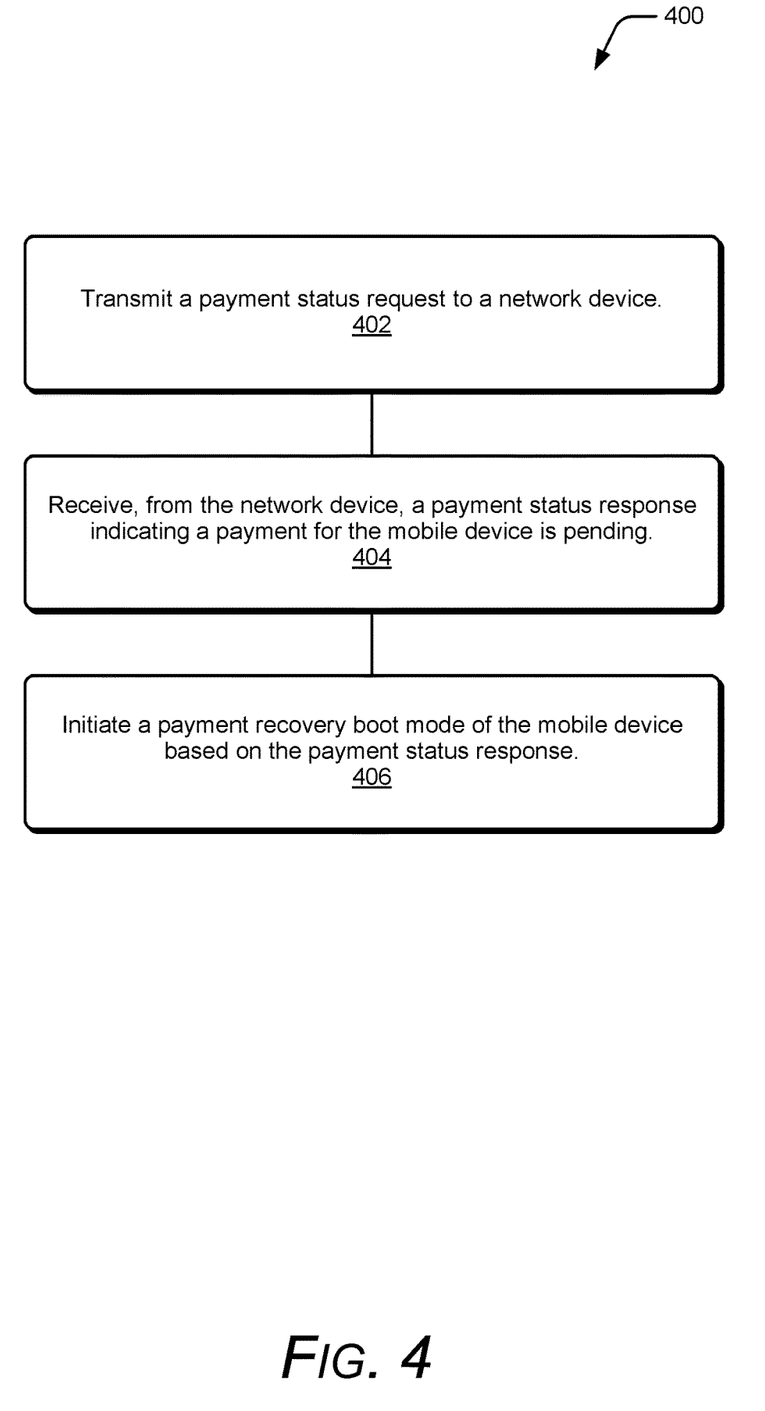
FIGS. 4-6 illustrate example methods for payment recovery boot mode of mobile devices in accordance with one or more implementations of the techniques described herein.

FIG. 4 illustrates example method(s) 400 for payment recovery boot mode of a mobile device. The order in which the method is described is not intended to be construed as a limitation, and any number or combination of the method operations described herein (e.g., of FIGS. 4, 5, and/or 6) may be performed in any order to perform a method, or an alternate method.

At 402, the method 400 includes transmitting a payment status request to a network device. For example, the payment controller 116 may transmit a payment status request to the network device 104.

At 404, the method 400 includes receiving, from the network device, a payment status response indicating a payment for the mobile device is pending. For example, the payment controller 116 receives a payment status response from the network device 104 indicating payment for the mobile device 102 is past due.

At 406, the method 400 includes initiating a payment recovery boot mode of the mobile device based on the payment status response. For example, the payment controller 116 initiates a payment recovery boot mode of the mobile device 102 based on the payment controller 116 receiving a payment status response from the network device 104.

Figure 5:
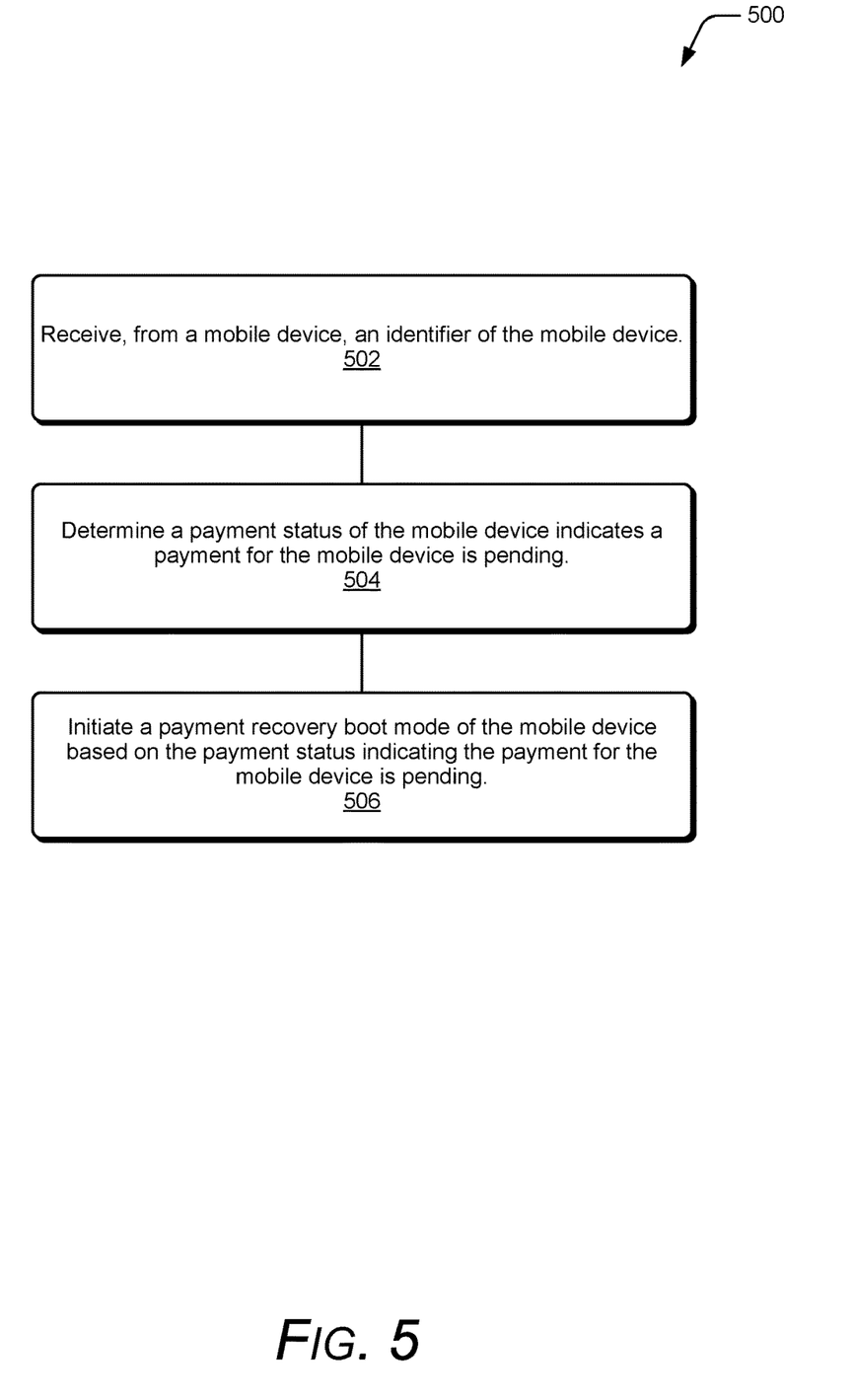

FIG. 5 illustrates example method(s) 500 for payment recovery boot mode of a mobile device. The order in which the method is described is not intended to be construed as a limitation, and any number or combination of the method operations described herein (e.g., of FIGS. 4, 5, and/or 6) may be performed in any order to perform a method, or an alternate method.

At 502, the method 500 includes receiving, from a mobile device, an identifier of the mobile device. For example, the payment controller 120 receives an identifier from the mobile device 102 while the mobile device 102 is rebooting and/or after the mobile device 102 has booted.

At 504, the method 500 includes determining a payment status of the mobile device indicates a payment for the mobile device is pending. For example, the payment controller 120 determines a payment status of the mobile device 102 based on a query of the payment database 122 indicating payment for the mobile device is past due.

At 506, the method 500 includes initiating a payment recovery boot mode of the mobile device based on the payment status indicating the payment for the mobile device is pending. For example, the payment controller 120 initiates payment recovery boot mode of the mobile device 102 based on the payment status indicating the payment for the mobile device 102 is past due. In at least one implementation, initiating the payment recovery boot mode includes transmitting a command to the mobile device 102 to boot into the payment recovery boot mode.

Figure 6:
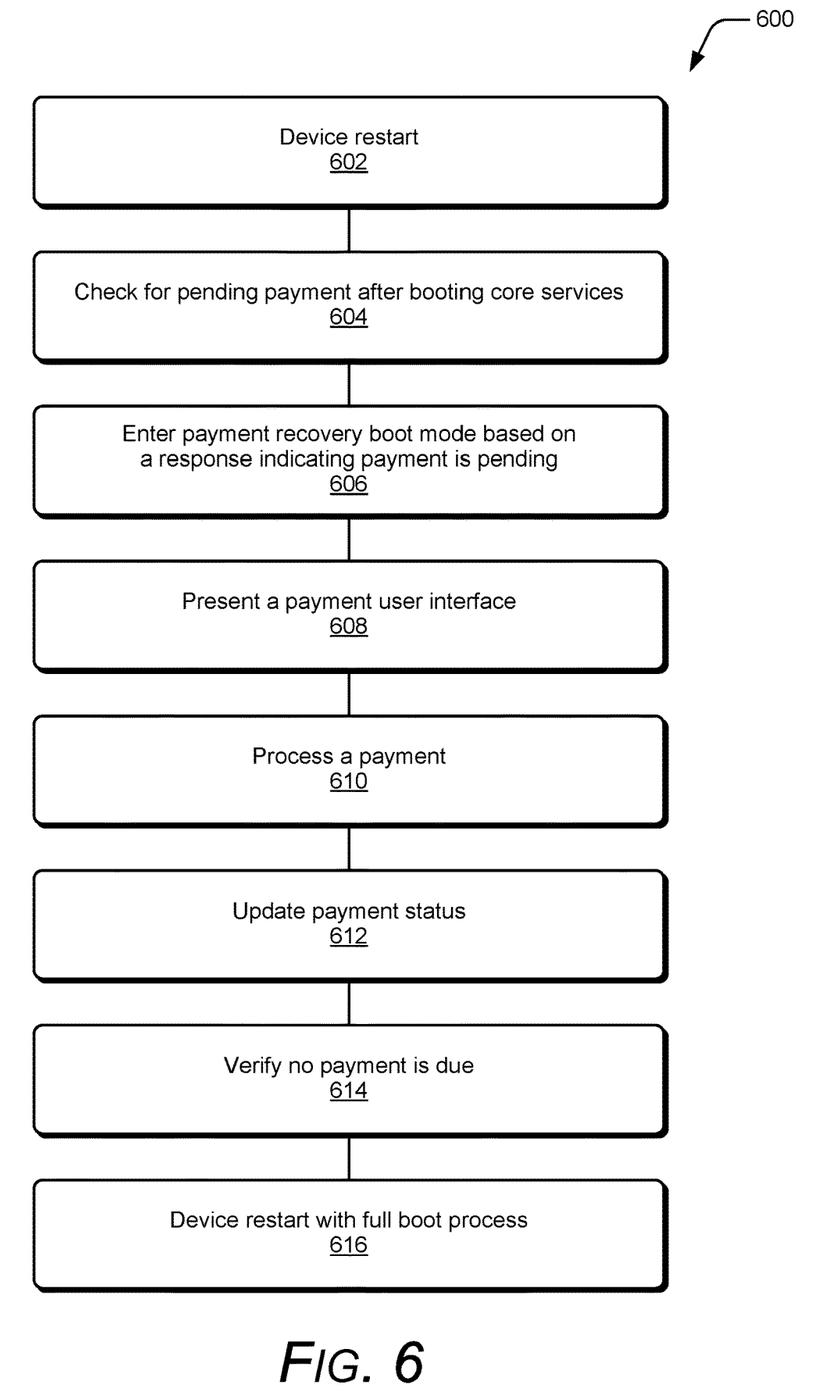

FIG. 6 illustrates example method(s) 600 for payment recovery boot mode of a mobile device. The order in which the method is described is not intended to be construed as a limitation, and any number or combination of the method operations described herein (e.g., of FIGS. 4, 5, and/or 6) may be performed in any order to perform a method, or an alternate method.

At 602, a device restarts. For example, the mobile device 102 restarts based on a user restarting the mobile device 102, based on the mobile device 102 restarting itself, and/or based on the network device 104 instructing the mobile device 102 to restart itself.

At 604, the device checks with a network service for pending payment after booting core services. For example, the mobile device 102 reboots and brings up its core services. Once networking is up, the system checks with the network device 104 if there is a pending payment. The service consults the payment database 122 and returns a response.

At 606, the device enters payment recovery boot mode based on a response indicating payment is pending. For example, when the network device 104 indicates a payment is pending (e.g., payment is past due), the mobile device 102 aborts continuing with a regular boot process and instead enters the payment recovery boot mode. Alternatively, when the network device 104 indicates that no payment is pending, then the system continues with the regular boot process (e.g., continue booting the mobile device 102 with full function or default function).

At 608, the payment recovery boot mode presents a payment user interface. For example, the payment recovery boot mode includes a payment interface displayed on the mobile device 102. The payment interface enables a user to make a payment entering details such as credit card information, banking information. In some cases, the payment interface enables the user to authenticate a payment request. For example, the payment recovery boot mode displays a one-time passcode received as a message at the mobile device 102 (e.g., via text message, short message service (SMS) message), enabling the user to authenticate the payment by entering the received one-time passcode in the payment interface.

At 610, the payment recovery boot mode processes a payment via the payment interface. For example, the payment interface enables payment processing in conjunction with the network device 104, which in turns works with a banking service (e.g., the payment service 108) to process the payment. For example, the network device 104 and/or the payment service 108 receive payment details, authenticate payment details, and update balances based on completing payment.

At 612, the payment status is updated on the device and/or a payment database. For example, the network device 104 sends a payment status to the mobile device 102. Additionally, or alternatively, the network device 104 updates the payment status (e.g., updates account balance, amount due, amount still owed, etc.) in the payment database 122.

At 614, the device verifies that no payment is due. For example, the mobile device 102 cross checks the network device 104 to verify that the payment is actually complete and there is no payment due.

At 616, the device restarts and completes the full boot process. For example, upon ensuring no payment is due, the mobile device 102 proceeds to complete a full regular boot process. In some cases, the network device 104 instructs the mobile device 102 to restart and perform a full boot process, enabling full functionality of the mobile device 102. During this reboot, the mobile device 102 may check whether payment is pending. If payment is pending (e.g., payment is still pending), then the mobile device 102 once again enters the payment recovery boot mode, displaying the payment interface. For example, if a user restarts the mobile device 102 while in the payment recovery boot mode and payment has not been made or payment was not successful, then the mobile device 102 once again enters the payment recovery boot mode during the reboot.

Figure 7:
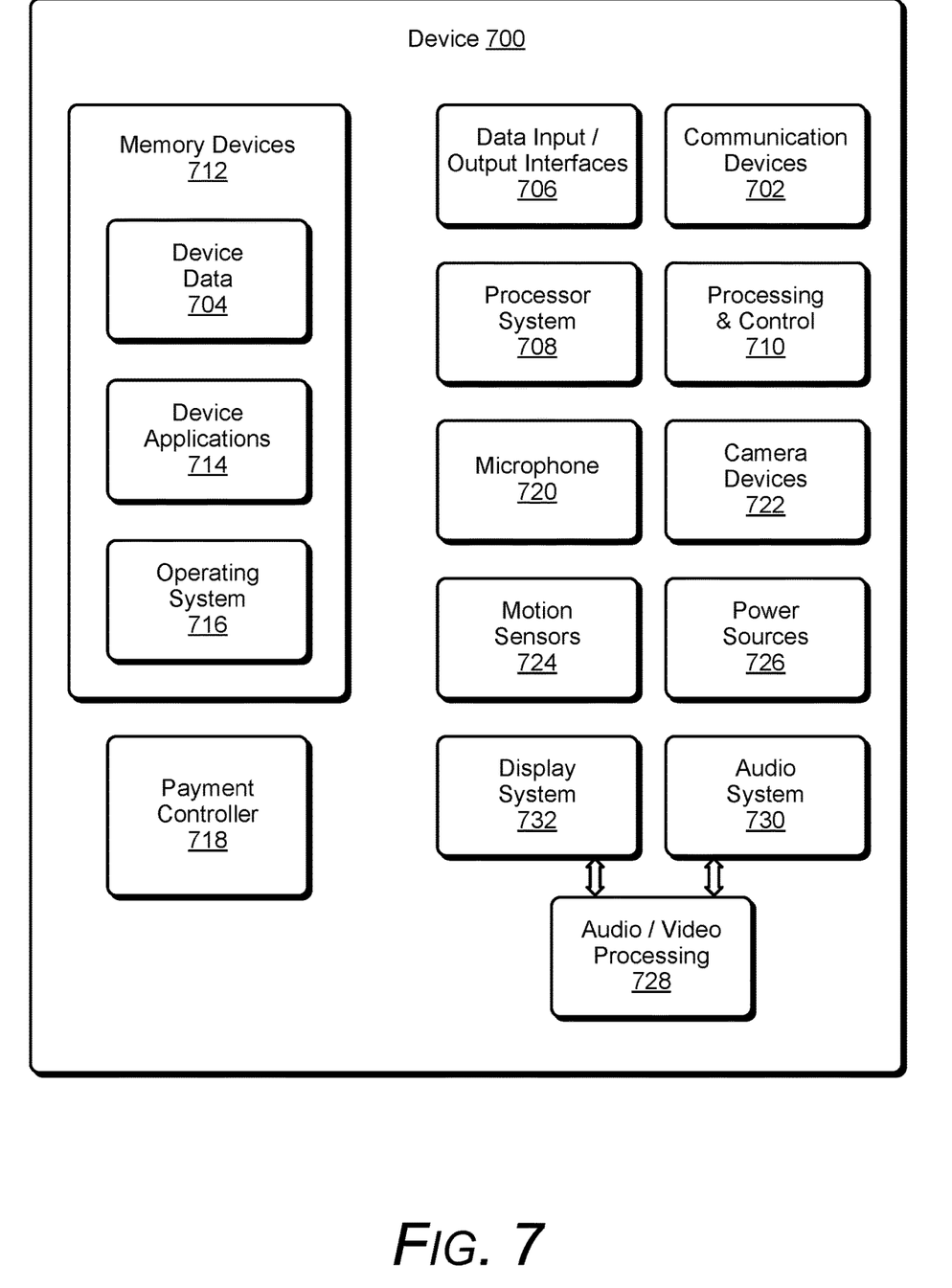
FIG. 7 illustrates various components of an example device that may be used to implement the techniques for payment recovery boot mode of mobile devices as described herein.

FIG. 7 illustrates various components of an example device 700, which can implement aspects of the techniques and features for payment recovery boot mode of mobile device, as described herein. The example device 700 may be implemented as any of the devices described with reference to the previous FIGS. 1-6, such as any type of a wireless device, mobile device, mobile phone, flip phone, client device, companion device, paired device, display device, tablet computing device, communication, entertainment, gaming, media playback, and/or any other type of computing and/or electronic device. For example, the mobile device 102 and/or the network device 104 described with reference to FIGS. 1-6 may be implemented as the example device 700.

The example device 700 can include various, different communication devices 702 that enable wired and/or wireless communication of device data 704 with other devices. The device data 704 can include any of the various devices data and content that is generated, processed, determined, received, stored, and/or communicated from one computing device to another. Generally, the device data 704 can include any form of audio, video, image, graphics, and/or electronic data that is generated by applications executing on a device. The communication devices 702 can also include transceivers for cellular phone communication and/or for any type of network data communication.

The example device 700 can also include various, different types of data input/output (I/O) interfaces 706, such as data network interfaces that provide connection and/or communication links between the devices, data networks, and other devices. The I/O interfaces 706 may be used to couple the device to any type of components, peripherals, and/or accessory devices, such as a computer input device that may be integrated with the example device 700. The I/O interfaces 706 may also include data input ports via which any type of data, information, media content, communications, messages, and/or inputs may be received, such as user inputs to the device, as well as any type of audio, video, image, graphics, and/or electronic data received from any content and/or data source.

The example device 700 includes a processor system 708 of one or more processors (e.g., any of microprocessors, controllers, and the like) and/or a processor and memory system implemented as a system-on-chip (SoC) that processes computer-executable instructions. The processor system 708 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 710. The example device 700 may also include any type of a system bus or other data and command transfer system that couples the various components within the device. A system bus can include any one or combination of different bus structures and architectures, as well as control and data lines.

The example device 700 also includes memory and/or memory devices 712 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 712 include volatile memory and non-volatile memory, fixed and removable media devices, and any suitable memory device or electronic data storage that maintains data for computing device access. The memory devices 712 can include various implementations of random-access memory (RAM), read-only memory (ROM), flash memory, and other types of storage media in various memory device configurations. The example device 700 may also include a mass storage media device.

The memory devices 712 (e.g., as computer-readable storage memory) provide data storage mechanisms, such as to store the device data 704, other types of information and/or electronic data, and various device applications 714 (e.g., software applications and/or modules). For example, an operating system 716 may be maintained as software instructions with a memory device 712 and executed by the processor system 708 as a software application. The device applications 714 may also include a device manager, such as any form of a control application, software application, signal-processing and control module, code that is specific to a particular device, a hardware abstraction layer for a particular device, and so on.

In one or more examples, the device 700 includes a payment controller 718 that implements various aspects of the described features and techniques described herein. The payment controller 718 is implemented with hardware components and/or in software as one of the device applications 714, such as when the example device 700 is implemented as the mobile device 102 and/or the network device 104 described with reference to FIGS. 1-6. An example of the payment controller 718 is the payment controller 116 implemented by the mobile device 102 and/or the payment controller 120 implemented by the network device 104, such as a software application and/or as hardware components in the mobile device 102 and/or in the network device 104. In implementations, the payment controller 718 includes independent processing, memory, and logic components as a computing and/or electronic device integrated with the example device 700.

The example device 700 can also include a microphone 720 (e.g., to capture an audio recording of a user to enter payment details) and/or camera devices 722 (e.g., to capture images of a credit card to enter payment details in the payment interface via the captured image), as well as motion sensors 724, such as may be implemented as components of an inertial measurement unit (IMU). The motion sensors 724 may be implemented with various sensors, such as a gyroscope, an accelerometer, and/or other types of motion sensors to sense motion of the device. The motion sensors 724 can generate sensor data vectors having three-dimensional parameters (e.g., rotational vectors in x, y, and z-axis coordinates) indicating location, position, acceleration, rotational speed, and/or orientation of the device. The example device 700 can also include one or more power sources 726, such as when the device is implemented as a wireless device and/or mobile device. The power sources may include a charging and/or power system, and may be implemented as a flexible strip battery, a rechargeable battery, a charged super-capacitor, and/or any other type of active or passive power source.

The example device 700 can also include an audio and/or video processing system 728 that generates audio data for an audio system 730 and/or generates display data for a display system 732. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 700. Alternatively, the audio system and/or the display system are external, peripheral components to the example device.

Although implementations for payment recovery boot mode of mobile devices have been described in language specific to features and/or methods, the appended claims are not necessarily limited to the specific features or methods described. Rather, the specific features and methods are disclosed as example implementations for payment recovery boot mode of mobile device, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

In some aspects, the techniques described herein relate to a mobile device, including: at least one memory; and at least one processor coupled with the at least one memory configured to cause the mobile device to: transmit a payment status request to a network device; receive, from the network device, a payment status response indicating a payment for the mobile device is pending; and initiate a payment recovery boot mode of the mobile device based on the payment status response.

In some aspects, the techniques described herein relate to a mobile device, wherein the payment status request is transmitted during a reboot of the mobile device.

In some aspects, the techniques described herein relate to a mobile device, wherein the reboot of the mobile device is based on a user input restarting the mobile device.

In some aspects, the techniques described herein relate to a mobile device, wherein the reboot of the mobile device is based on the mobile device receiving a reboot command from the network device.

In some aspects, the techniques described herein relate to a mobile device, wherein the at least one processor is configured to cause the mobile device to: display a payment interface in the payment recovery boot mode; receive, in the payment interface, user input that includes payment details; and transmit the payment details to the network device.

In some aspects, the techniques described herein relate to a mobile device, wherein the at least one processor is configured to cause the mobile device to: display, while in the payment recovery boot mode, a one-time passcode received from the network device; and transmit, to the network device while in the payment recovery boot mode, a user input entered in response to the one-time passcode.

In some aspects, the techniques described herein relate to a mobile device, wherein the one-time passcode is received based on transmission of the payment details to the network device.

In some aspects, the techniques described herein relate to a mobile device, wherein the at least one processor is configured to cause the mobile device to: receive, from the network device while in the payment recovery boot mode, a confirmation that the payment for the mobile device is up to date; and restart the mobile device from the payment recovery boot mode and initiate a full access boot mode based on the confirmation that the payment is up to date.

In some aspects, the techniques described herein relate to a mobile device, wherein the payment recovery boot mode locks full access to the mobile device until a requested payment is confirmed.

In some aspects, the techniques described herein relate to a network device, including: at least one memory; and at least one processor coupled with the at least one memory configured to cause the network device to: receive, from a mobile device, an identifier of the mobile device; determine a payment status of the mobile device indicates a payment for the mobile device is pending; and initiate a payment recovery boot mode of the mobile device based on the payment status indicating the payment for the mobile device is pending.

In some aspects, the techniques described herein relate to a network device, wherein to initiate the payment recovery boot mode, the at least one processor is configured to cause the network device to transmit a reboot command to the mobile device.

In some aspects, the techniques described herein relate to a network device, wherein to determine the payment status of the mobile device indicates the payment for the mobile device is past due, the at least one processor is configured to cause the network device to: query a payment database using the identifier of the mobile device while the mobile device is booted with full access; and transmit the reboot command to the mobile device based on the query indicating the payment for the mobile device is past due.

In some aspects, the techniques described herein relate to a network device, wherein to initiate the payment recovery boot mode, the at least one processor is configured to cause the network device to: query a payment database based on a payment status request received from the mobile device while the mobile device is rebooting; and transmit, to the mobile device while the mobile device is rebooting, a payment status response indicating the payment for the mobile device is past due.

In some aspects, the techniques described herein relate to a network device, wherein the at least one processor is configured to cause the network device to: receive payment details from the mobile device; and transmit the payment details to a payment service.

In some aspects, the techniques described herein relate to a network device, wherein the at least one processor is configured to cause the network device to: receive a one-time passcode from the payment service based on transmission of the payment details to the payment service; and transmit the one-time passcode to the mobile device.

In some aspects, the techniques described herein relate to a network device, wherein the at least one processor is configured to cause the network device to: receive a user input entered in response to the one-time passcode; and transmit the user input to the payment service.

In some aspects, the techniques described herein relate to a network device, wherein the at least one processor is configured to cause the network device to: receive a payment confirmation from the payment service based on the transmission of the user input; update a payment database on the network device based on the payment confirmation; and transmit, to the mobile device, a confirmation that the payment for the mobile device is up to date.

In some aspects, the techniques described herein relate to a method, including: transmitting, during a reboot of a mobile device, a payment status request to a network device; receiving, from the network device, a payment status response indicating a payment for the mobile device is past due; and initiating a payment recovery boot mode of the mobile device based on the payment status response.

In some aspects, the techniques described herein relate to a method, wherein the reboot of the mobile device is based on: a user input restarting the mobile device; or the mobile device receiving a reboot command from the network device.

In some aspects, the techniques described herein relate to a method, further including: displaying a payment interface in the payment recovery boot mode; receiving, in the payment interface, user input that includes payment details; and transmitting the payment details to the network device while the mobile device is in the payment recovery boot mode.

What is claimed:

1. A mobile device, comprising:
   at least one memory; and
   at least one processor coupled with the at least one memory configured to use the mobile device to:
      transmit, during a reboot of a mobile device, a payment status request to a network device;
      receive, from the network device, a payment status response indicating a payment for the mobile device is pending; and
      initiate a payment recovery boot mode of the mobile device based on the payment status response.

2. The mobile device of claim 1, wherein the reboot of the mobile device is based on a user input restarting the mobile device.

3. The mobile device of claim 1, wherein the reboot of the mobile device is based on the mobile device receiving a reboot command from the network device.

4. The mobile device of claim 1, wherein the at least one processor is configured to cause the mobile device to:
   display a payment interface in the payment recovery boot mode;
   receive, in the payment interface, user input that includes payment details; and
   transmit the payment details to the network device.

5. The mobile device of claim 4, wherein the at least one processor is configured to cause the mobile device to:
   display, while in the payment recovery boot mode, a one-time passcode received from the network device; and
   transmit, to the network device while in the payment recovery boot mode, a user input entered in response to the one-time passcode.

6. The mobile device of claim 5, wherein the one-time passcode is received based on transmission of the payment details to the network device.

7. The mobile device of claim 1, wherein the at least one processor is configured to cause the mobile device to:
   receive, from the network device while in the payment recovery boot mode, a confirmation that the payment for the mobile device is up to date; and
   restart the mobile device from the payment recovery boot mode and initiate a full access boot mode based on the confirmation that the payment is up to date.

8. The mobile device of claim 1, wherein the payment recovery boot mode locks full access to the mobile device until a requested payment is confirmed.

9. A method, comprising:
   transmitting, during a reboot of a mobile device, a payment status request to a network device;
   receiving, from the network device, a payment status response indicating a payment for the mobile device is past due; and
   initiating a payment recovery boot mode of the mobile device based on the payment status response.

10. The method of claim 9, wherein the reboot of the mobile device is based on:
    a user input restarting the mobile device; or
    the mobile device receiving a reboot command from the network device.

11. The method of claim 9, further comprising:
    displaying a payment interface in the payment recovery boot mode;
    receiving, in the payment interface, user input that includes payment details; and
    transmitting the payment details to the network device while the mobile device is in the payment recovery boot mode.

12. The method of claim 9, further comprising:
    receiving, from the network device while in the payment recovery boot mode, a confirmation that the payment for the mobile device is up to date; and
    restarting the mobile device from the payment recovery boot mode and initiating a full access boot mode based on the confirmation that the payment is up to date.

13. The method of claim 9, wherein the payment recovery boot mode locks full access to the mobile device until a requested payment is confirmed.

14. A system, comprising:
    at least one memory; and
    at least one processor coupled with the at least one memory configured to cause the system to:
       transmit, during a reboot of a mobile device, a payment status request to a network device;
       receive, from the network device, a payment status response indicating a payment for the mobile device is pending; and
       initiate a payment recovery boot mode of the mobile device based on the payment status response.

15. The system of claim 14, wherein the reboot of the mobile device is based on a user input restarting the mobile device.

16. The system of claim 14, wherein the reboot of the mobile device is based on the mobile device receiving a reboot command from the network device.

17. The system of claim 14, wherein the at least one processor is configured to cause the mobile device to:
    display a payment interface in the payment recovery boot mode;
    receive, in the payment interface, user input that includes payment details; and
    transmit the payment details to the network device.

18. The system of claim 17, wherein the at least one processor is configured to cause the mobile device to:
- display, while in the payment recovery boot mode, a one-time passcode received from the network device; and
- transmit, to the network device while in the payment recovery boot mode, a user input entered in response to the one-time passcode.

19. The system of claim 18, wherein the one-time passcode is received based on transmission of the payment details to the network device.

20. The system of claim 14, wherein the at least one processor is configured to cause the mobile device to:
- receive, from the network device while in the payment recovery boot mode, a confirmation that the payment for the mobile device is up to date; and
- restart the mobile device from the payment recovery boot mode and initiate a full access boot mode based on the confirmation that the payment is up to date.

* * * * *